(12) United States Patent
Boylan

(10) Patent No.: US 6,715,959 B2
(45) Date of Patent: Apr. 6, 2004

(54) FISH LADDER FOR PASSING DAMS

(75) Inventor: Delmer Boylan, Bruneau, ID (US)

(73) Assignee: BGA Limited Partnership, Boise, ID (US)

(*) Notice: Subject to any disclaimer, the term of this patent is extended or adjusted under 35 U.S.C. 154(b) by 0 days.

(21) Appl. No.: 10/205,409

(22) Filed: Jul. 24, 2002

(65) Prior Publication Data

US 2004/0018057 A1 Jan. 29, 2004

(51) Int. Cl.⁷ .................................................. E06B 8/08
(52) U.S. Cl. ........................................ 405/82; 405/81
(58) Field of Search .............................. 405/81, 82, 83, 405/84

(56) References Cited

U.S. PATENT DOCUMENTS 1,718,181 A * 6/1929 Province et al. ............... 405/81
4,260,286 A * 4/1981 Buchanan ..................... 405/82

FOREIGN PATENT DOCUMENTS

JP  06128927 A  *  5/1994  ............. E02B/8/08

* cited by examiner

Primary Examiner—Heather Shackelford
Assistant Examiner—Lisa M. Saldano
(74) Attorney, Agent, or Firm—Pedersen & Co., PLLC; Ken J. Pedersen; Barbara S. Pedersen

(57) ABSTRACT

The present invention is a safe and effective fish ladder for assisting fish in overcoming dams, especially in the upstream direction. The ladder comprises a series of relatively vertical open pools, which decrease in size in the upstream direction, the pools being conveniently spaced apart a vertical distance which may be easily jumped by the particular fish species of interest. By being arranged relatively vertically, so that the downstream perimeter of one pool is substantially within the downstream perimeter of the pool directly beneath the one pool, the fish ladder does not need to be long and expensive if the dam to overcome is high. Also, by being relatively vertical, the ladder may be conveniently built onto already existing vertical components on the downstream side of a dam, for example, onto the support structure for the discharge flume for downstream migrating fish in the apparatus disclosed in U.S. Pat. No. 5,161,913 (Boylan). Or, by being relatively vertical, the ladder of the present invention may be built even onto the downstream side of the dam itself.

10 Claims, 4 Drawing Sheets

FISH LADDER FOR PASSING DAMS

DESCRIPTION

BACKGROUND OF THE INVENTION

1. Field of the Invention.

This invention relates generally to migratory fish in rivers and streams. More particularly, this invention relates to fish ladder apparati for assisting migratory fish in overcoming river and stream obstructions such as dams, especially in the upstream direction.

2. Related Art.

Many devices have been designed and built to assist fish in overcoming dams. Often, these devices have been culverts, flumes or sluices with internal baffles. Typically, the culvert is tipped at an angle to match the upward grade change in the waterway, and water flows down through the culvert. The baffles may have vertical slots or lowered horizontal weir edges for permitting passage of the fish up through the water in the culvert. The migrating fish may take short rests on the upstream side of the baffles and weir edges.

Otherwise, these migratory fish assistance devices have been angled ramps with bristles, for example, installed on the top surface of the ramp. Otherwise, these devices have also been mechanically powered elevators, lifts or locks which allow the fish to be transported over the dam. See, for example, *Innovations in Fish Passage Technology*, edited by Mufeed Odeh (Published by The American Fisheries Society, Bethesda, Md.—1999).

U.S. Pat. No. 1,573,785 (Albright) discloses a waterwheel-driven fish ladder with a belt conveyor for lifting fish over a dam.

U.S. Pat. No. 4,260,286 (Buchanan) discloses a fish ladder comprising an edge-to-edge length-wise series of ascending dish-like compartments. The dish-like compartments are arranged end edge to end edge from the bottom to the top of the ladder, and water overflows from the top to the bottom of the ladder. Auxiliary water input may be provided to each dish in the series to maintain the desired turbulence in each dish and flush debris from the ladder.

U.S. Pat. No. 5,139,364 (Takahashi, et al.) discloses an inclined ramp fishway with internal weir/baffles. The ramp is pivotable vertically to accommodate different water levels at the upstream end of the ramp.

Still, there is a need for a compact, easy-to-build fish ladder for assisting fish in easily and safely overcoming dams, especially in the upstream direction. This invention addresses that need.

SUMMARY OF THE INVENTION

The present invention is a safe and effective fish ladder for assisting fish in overcoming dams, especially in the upstream direction. The ladder comprises a series of open pools, which decrease in size in the upstream direction, the pools being conveniently spaced apart a vertical distance which may be easily jumped by the particular fish species of interest. By being arranged relatively vertically, so that the downstream perimeter of one pool is substantially within the downstream perimeter of the pool directly beneath the one pool, the fish ladder does not need to be long and expensive if the dam to overcome is high. Also, by being relatively vertical, the ladder may be conveniently built onto already existing vertical structures on the downstream side of a dam, for example, onto the support structure for the discharge flume for downstream migrating fish in the apparatus disclosed in U.S. Pat. No. 5,161,913 (Boylan), incorporated herein by reference. Or, the ladder of the present invention may be built even onto the downstream side of the dam itself. Preferably, the fish ladder of the present invention is made of a smooth material which does not aggravate the sensitive skin of the fish.

DETAILED DESCRIPTION OF THE INVENTION

Referring to the Figures, there are depicted several, but not all, embodiments of the present invention.

Figure 1:
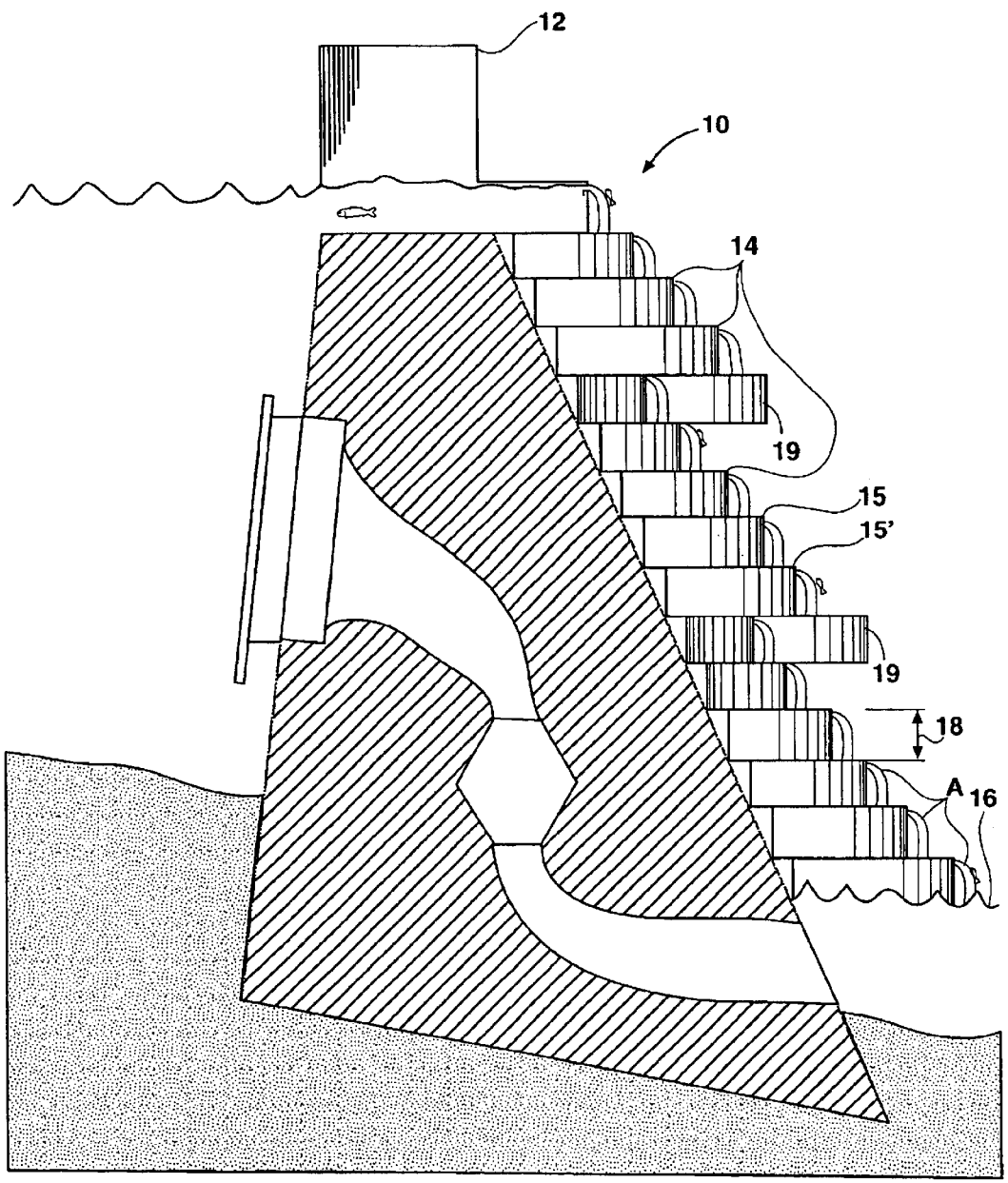
FIG. 1 is a partly cross-sectional, side schematic view of one embodiment of the vertical fish ladder of the present invention built directly onto the downstream side of a dam.

In FIG. 1, vertical fish ladder 10 of the present invention is supported by the downstream side of a dam 12. Also, the fish ladder 10 of the present invention may be built onto the downstream side of a dam. The construction of the fish ladder 10 then, may be during or after the construction of the dam by which it is supported, or onto which it is built.

Vertical ladder 10 has ascending open pools 14. Preferably, as may be seen in FIGS. 2 and 3, the size of the pools 14 decrease in the upstream direction. By "upstream" direction, I mean opposite to the stream flow direction. By "downstream" direction, I mean the same as the stream flow direction. This way, if a fish jumps and misses a next vertical pool, and falls back towards the first pool from which it leapt, it is more likely to fall safely into the first pool, instead of falling "off" the ladder. Preferably, as also may be seen from FIG. 3, the pools 14 are stacked so that the downstream perimeter 15 of one pool is substantially within the downstream perimeter 15' of the pool directly beneath the one pool, when viewed from the top of the pools. This is to say that the downstream perimeter 15 of one pool is upstream of the downstream perimeter 15' of the pool directly beneath the one pool in at least two, and preferably in three, directions (left, right, and back(upstream towards the downstream side of the dam)). This is the best way to ensure that, if a fish falls from a pool, it is most likely to fall into the pool directly beneath that pool from which it fell, and not fall further "off the ladder". These ascending open pools extend from near the surface 16 of the downstream body of water to near the top of the dam. Preferably, the vertical distance 18 between pools is about 3–9 feet, with about 6 feet being preferred for pacific salmon species.

Figure 2:
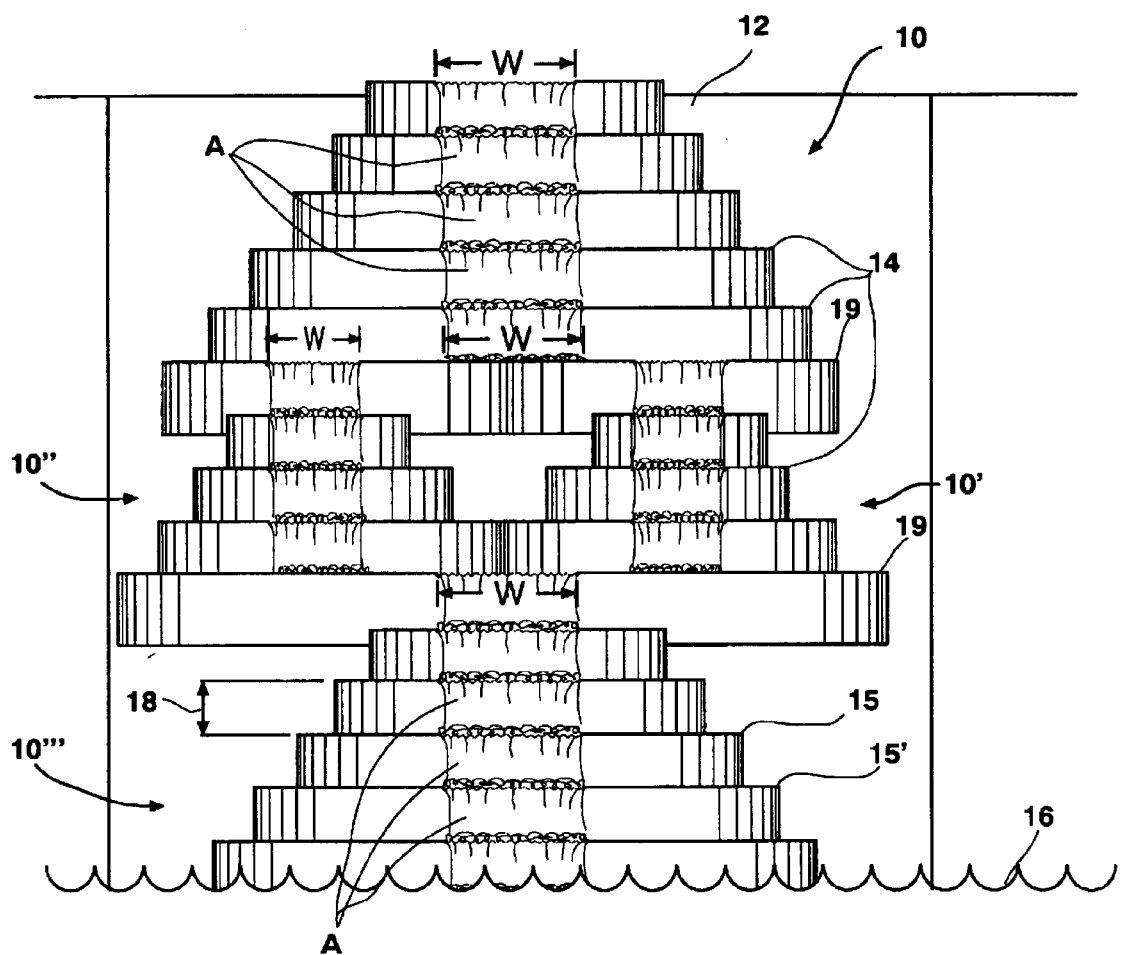
FIG. 2 is a front, schematic view of one embodiment of the vertical fish ladder of the present invention with several sets of ladders provided after part way up the downstream side of a dam.
Figure 3:
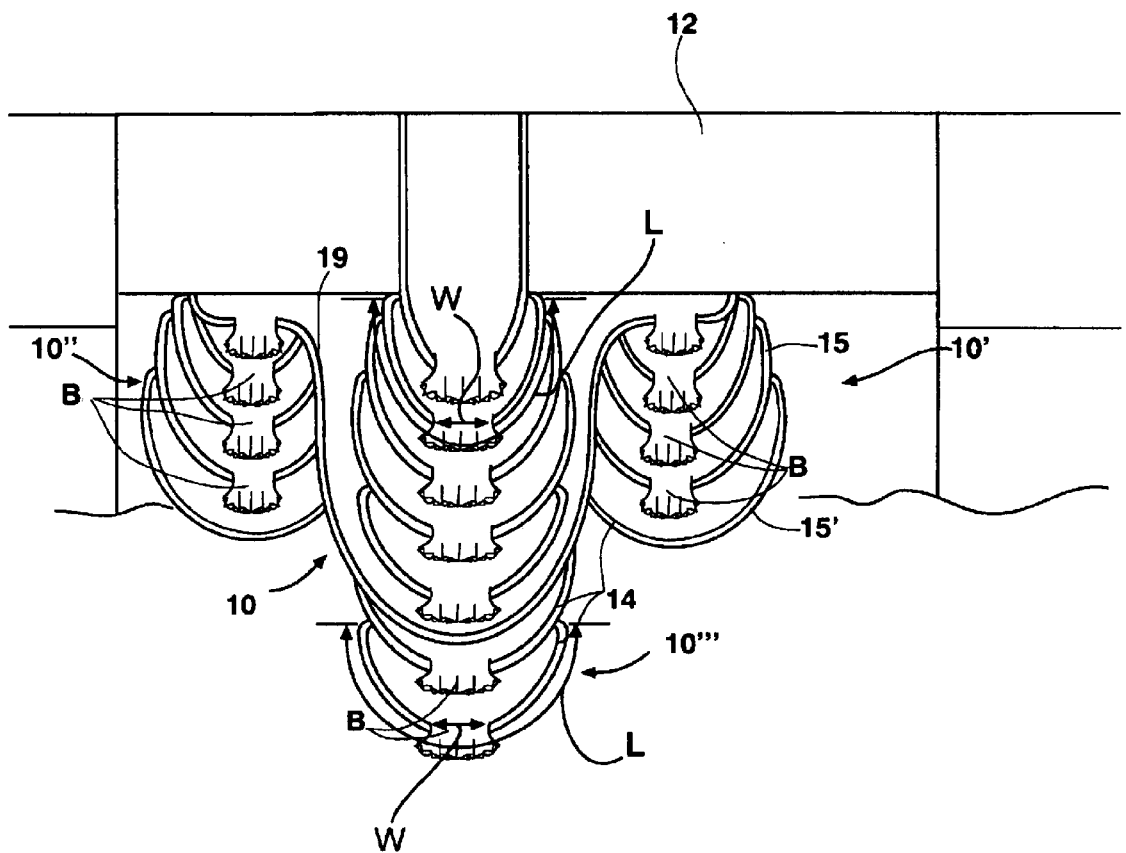
FIG. 3 is a top, schematic partial view of the embodiment depicted in FIG. 2.

Because the consecutive pools 14 of this invention preferably decrease in size up the downstream side of the dam 12, additional sets of ladders, depicted as 10', 10" and 10'" in FIGS. 2 and 3, may be provided after part way up the dam. Also, several different ladders all the way up the dam may be provided. Or, the ladder(s) may be provided next to a lateral side of the dam or other obstruction, for example, on one or both banks of a river around a dam.

When several different ladders are provided, there may be "transition pools" 19 between ladders. "Transition pools" 19 may not satisfy the parameter that the downstream perimeter 15 of one pool is substantially within the downstream perimeter 15' of the pool directly beneath the one pool. Also, "transition pools" 19 may not satisfy the parameter that the downstream perimeter 15 of one pool is upstream of the downstream perimeter 15' of the pool directly beneath the one pool in two or three directions. However, preferably even "transition pools" 19 are provided to partly satisfy these parameters, and to satisfy them as much as possible.

These "transition pools" 19 may also be "resting pools". It is understood that the migrating fish are typically challenged by fast water to proceed upstream vigorously against it and jump to overcome barriers in the way, if necessary. Therefore, by providing downspouts of water A from lowered regions, or "spouts" B in the downstream perimeters 15 and 15' of the pools, the transit of the fish may be controlled and assisted. For example, the flow of water through a "transition pool" 19 may be made slower than through regular pools 14. Also, the "spout" B into a "transition pool" 19 may not be directly in line with the pool 14 directly beneath the "transition pool" 19. This way, the fish must preferably change direction, and swim upstream against the slower flow in the "transition pool" 19, hopefully resting at least a little bit. The spouts illustrated in FIGS. 2 and 3 have a width W that is substantially shorter than the length L of the circumference of the outer perimeter wall. As illustrated in FIGS. 2 and 3 many of the open pools have only a single spout and water overflows from pool to pool at said single spout and not all along the outer perimeter wall.

In FIG. 3, a top view of the embodiment depicted in FIG. 2, it is apparent that the relatively vertical pools 14 of the present invention substantially overlap in the horizontal direction. This way, the horizontal length of the ladder structure need not be so long as for example, a fish ladder with edge-to-edge ascending pools as depicted in U.S. Pat. No. 4,260,286 (Buchanan).

Figure 4:
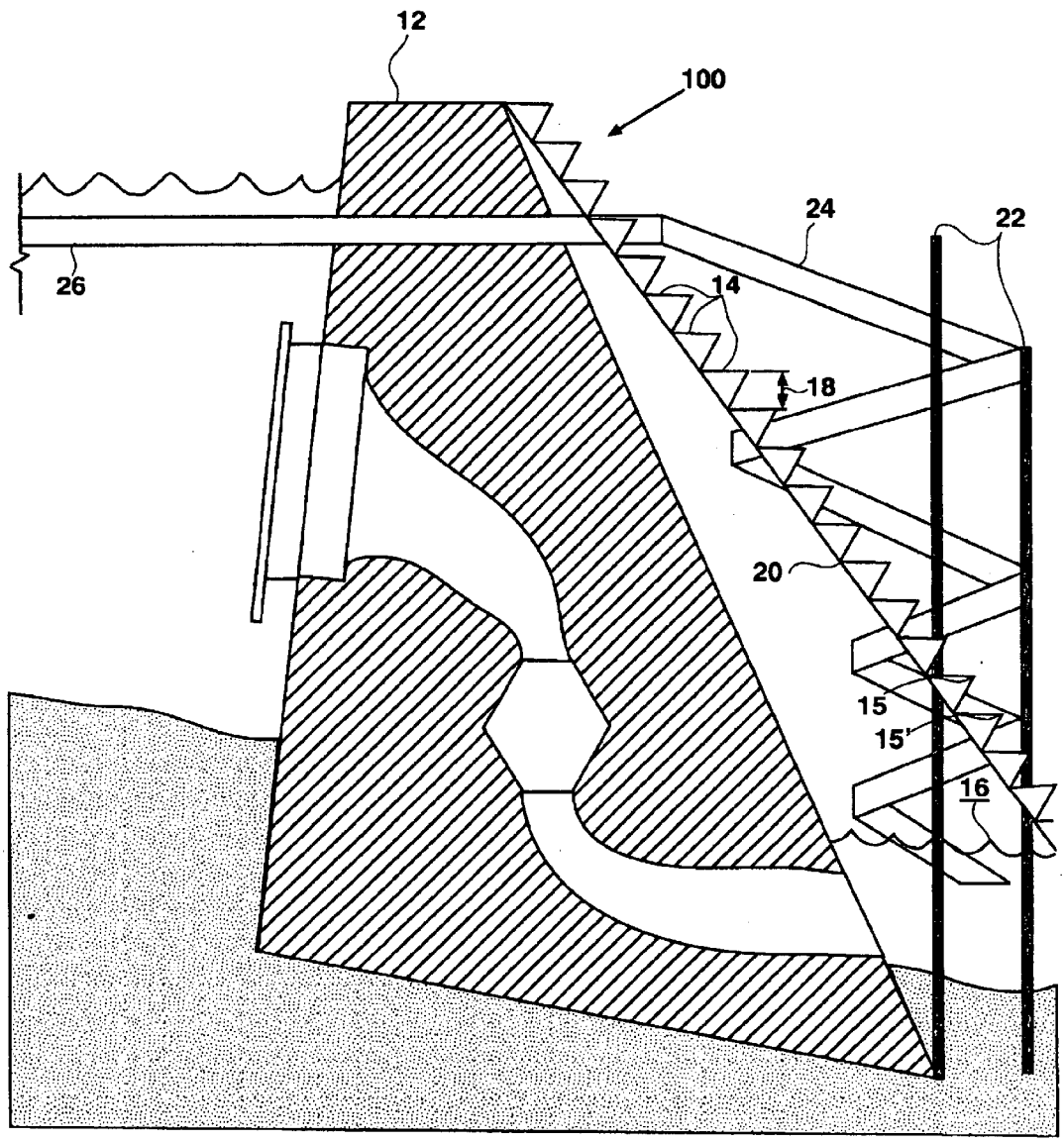
FIG. 4 is a partly cross-sectional, side schematic view of one embodiment of the vertical fish ladder of the present invention built onto the structure which supports the downstream flume of the fish pipeline disclosed in U.S. Pat. No. 5,161,913.

In FIG. 4, there is a partly cross-sectional view of another embodiment 100 of the vertical fish ladder of the present invention. Ladder 100 is built onto and supported by the structural panel 20 and posts 22 which support the downstream flume 24 of the fish pipeline 26 disclosed, for example, in U.S. Pat. No. 5,161,913 (Boylan et al.). This way, the fish ladder of the present invention may be conveniently constructed on the support structures on the downstream side of dam 12 for supporting other, possibly already-existing, equipment such as downstream flume 24.

Preferably, the fish ladder 100 depicted in FIG. 4 has all the features of ladders 10, 10' and 10''' depicted in FIGS. 1–3. However, this is not necessary.

Preferably, all the fish ladders disclosed herein are constructed of a smooth material so they do not harm the sensitive scaled skin of the fish. Preferably, the ladders are made of steel, especially stainless steel. Or the ladders may be made of other materials, and lined with steel, rubber or plastic. It is best to avoid rough materials like concrete, and sharp or abrupt edges of any kind.

Although this invention has been described above with reference to particular means, materials and embodiments, it is to be understood that the invention is not limited to these disclosed particulars, but extends instead to all equivalents within the broad scope of the following claims.

What is claimed is:

1. A fish transit system for assisting fish in overcoming a stream obstructions, comprising:
   an upstream fish transit ladder, comprising:
      a plurality of open pools, the pools being spaced apart a vertical distance which may be easily jumped by the fish and each pool having an outer perimeter wall adapted to allow water to overflow said outer perimeter wall from pool to pool, said upstream fish transit ladder having an upper end at or near the top of the stream obstruction and a lower end at or near the surface of said stream on the downstream side of the stream obstruction,
   water flow from the top end of the upstream fish transit ladder to the bottom end of said ladder via overflow of water from pool to pool over said outer perimeter wall of each pool:
   a downstream fish transit flume, comprising:
      a flume upper end at or near the top of said stream obstruction,
      a flume lower end at or near the surface of said stream on the downstream side of said stream obstruction, and
      water flow from said the flume upper end to the flume lower end; and
   a support structure on the downstream side of said stream obstruction wherein said support structure supports both the upstream fish transit ladder and the downstream fish transit flume and connects both the upstream fish transit ladder and the downstream fish transit flume to the downstream side of said stream obstruction.

2. The fish transit system of claim 1 wherein said stream obstruction is a dam.

3. A fish ladder for assisting fish in overcoming stream obstructions, the fish ladder comprising:
   a first set of open pools that are spaced apart a vertical distance that may be easily jumped by fish;
   wherein each open pool of said first set has an outer perimeter wall that is substantially within the downstream perimeter of the next lower open pool;
   wherein each open pool of said first set has a single spout in said outer perimeter wall, said single spout having a width that is substantially shorter than the circumferential length of its respective outer perimeter wall, so that each pool is adapted to allow water to exit each pool at said single spout and not all along said outer perimeter wall,
   wherein said first set has an uppermost open pool, and wherein the fish ladder further comprises a second set of open pools above said first set of open pools, said second set having a lowermost open pool that is larger than, and in fluid communication with, said uppermost open pool of the first set.

4. The fish ladder of claim 3, wherein the open pools of said first set decrease in size in the ascending direction.

5. The fish ladder of claim 3, further comprising a third set of open pools that is beside said second set of open pools, and that is above, and in liquid communication with, said first set of open pools.

6. The fish ladder of claim 3, wherein said stream obstruction is a dam.

7. The fish ladder of claim 3, wherein said single spout is located at a front edge of each of said open pools.

8. A fish ladder for assisting fish in overcoming a stream obstruction, the fish ladder comprising:

a lower set of open pools spaced apart a vertical distance that may be easily jumped by fish, each of said open pools having an outer perimeter wall that is substantially within the downstream perimeter of the next lower pool, and said lower set of open pools having an uppermost pool;

a transition pool above said lower set of open pools, said transition pool being larger in size than said uppermost pool and having a transition pool outer perimeter wall comprising a transition pool spout adapted to allow overflow of water to said uppermost pool;

an upper set of open pools above said transition pool, the open pools of said second set being spaced apart a vertical distance that may be easily jumped by fish and each having an outer perimeter wall that is substantially within the downstream perimeter of the next lower pool in said upper set, and the upper set of open pools having a lowermost pool having a lowermost pool outer perimeter wall comprising a lowermost pool spout adapted to allow overflow of water to said transition pool;

wherein said transition spout is horizontally distanced from said lowermost pool spout so that fish jumping up into said transition pool at said transition pool spout will swim horizontally upstream through said transition pool to reach said lowermost pool spout and will jump up into said lowermost pool via the lowermost pool spout, whereby said swimming horizontally upstream through said transition pool provides rest for the fish.

9. The fish ladder of claim 8, comprising a second upper set of open pools above said transition pool and beside said upper set of open pools, the second upper set of open pools being in liquid communication with said transition pool via a second upper set spout that is horizontally distanced from said transition pool spout so that some fish jumping up into said transition pool at said transition pool spout will swim horizontally upstream through said transition pool to reach said second upper set water spout and will jump up into said second upper set of open pools via the second upper set water spout, whereby swimming horizontally upstream through said transition pool provides rest for the fish.

10. The fish ladder of claim 8, wherein said stream obstruction is a dam and the fish ladder is attached to and extends up along a downstream surface of the dam.

* * * * *